(No Model.) 4 Sheets—Sheet 1.
J. A. OSENBRÜCK.
Bearing.
No. 229,171. Patented June 22, 1880.
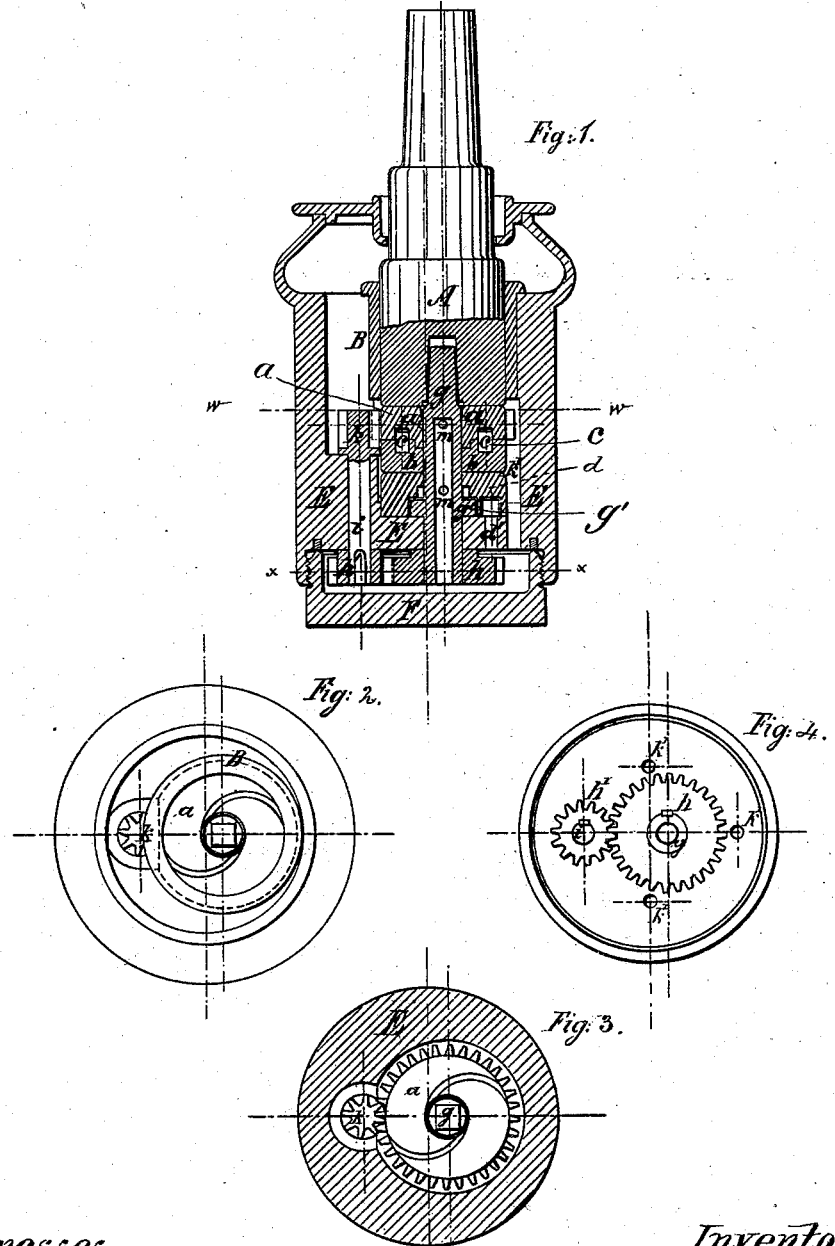
Witnesses:
A. Sedgwick
J. H. Scarborough
Inventor:
J. A. Osenbrück
by
Munn & Co
Attorneys.

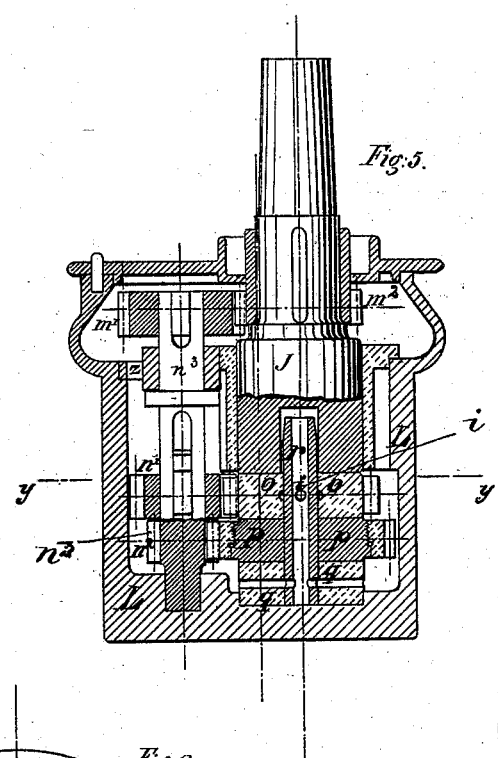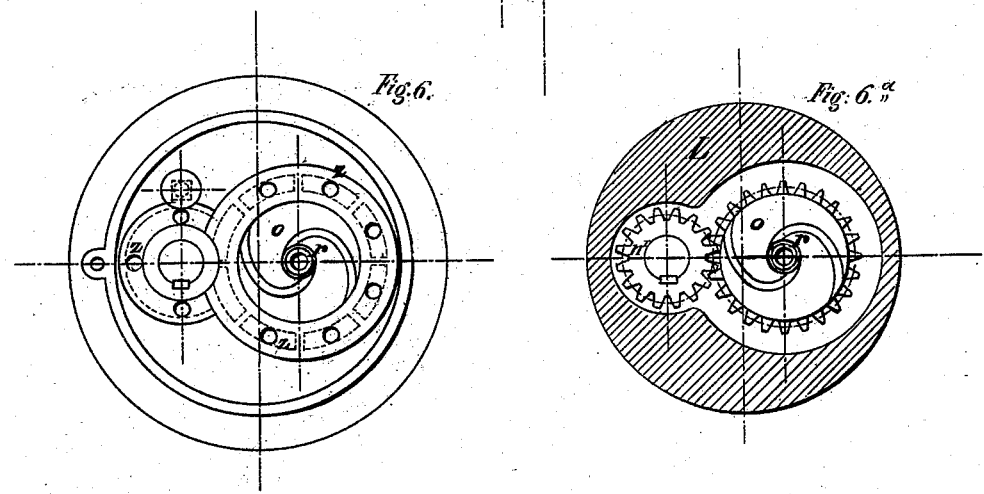

(No Model.) 4 Sheets—Sheet 3.
J. A. OSENBRÜCK.
Bearing.
No. 229,171. Patented June 22, 1880.
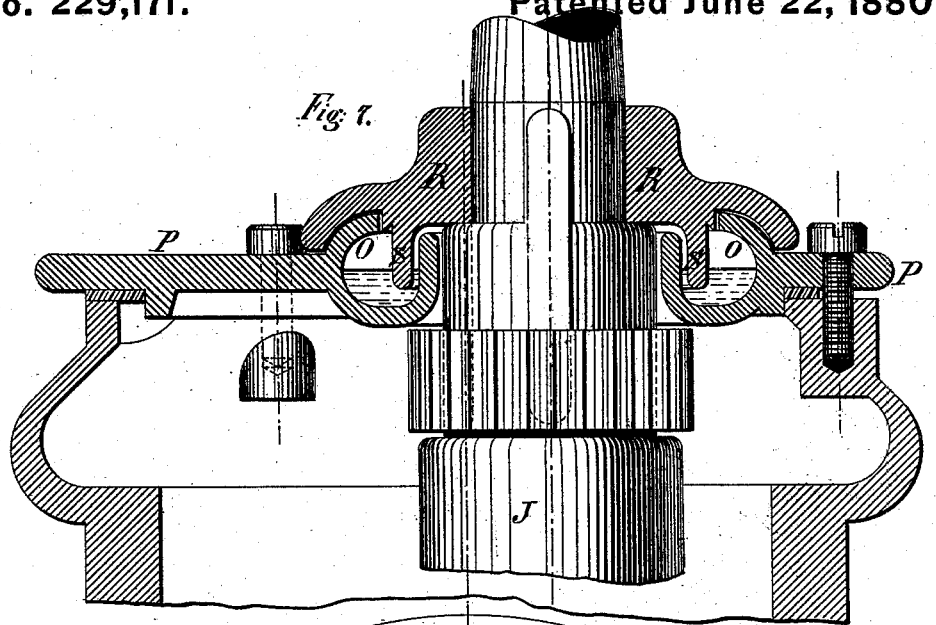
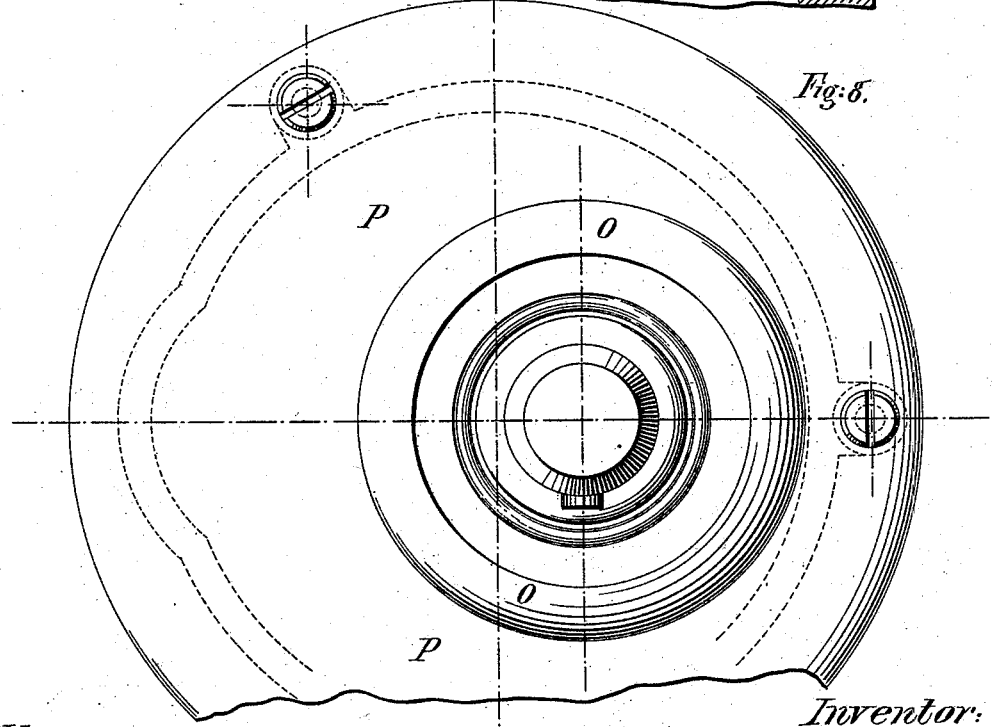
Witnesses:
C. Sedgwick
J. H. Scarborough
Inventor:
J. A. Osenbrück
by Munn & Co
Attorneys.

(No Model.) 4 Sheets—Sheet 4.
J. A. OSENBRÜCK.
Bearing.
No. 229,171. Patented June 22, 1880.
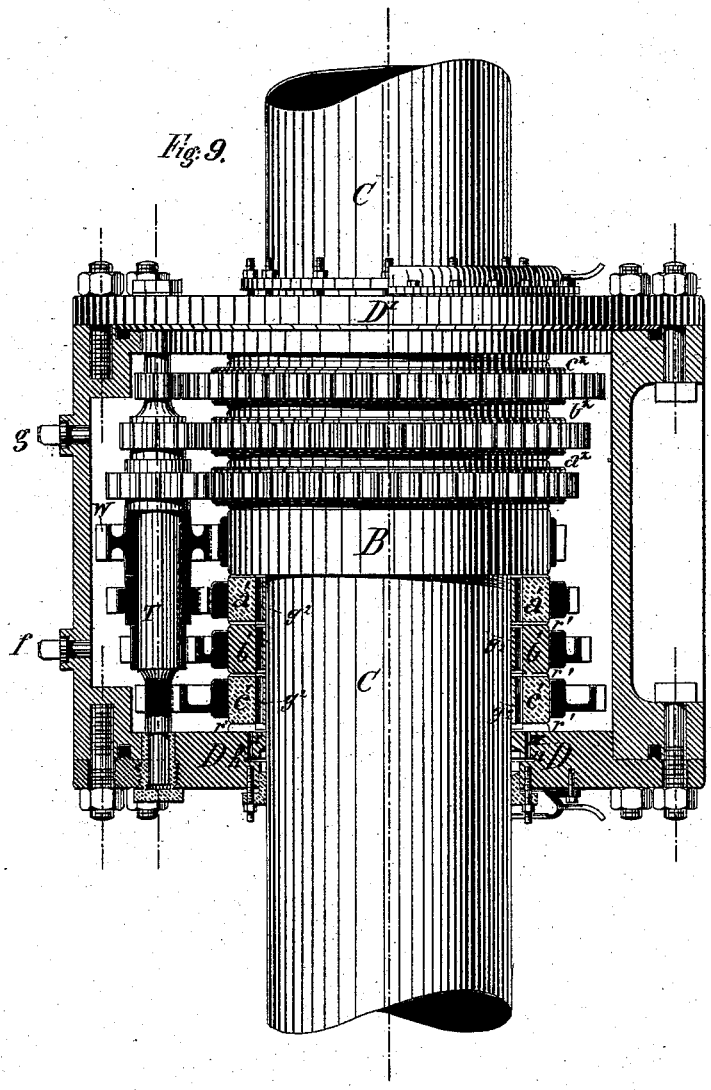
Witnesses:
C. Sedgwick
J. H. Harborough
Inventor:
J. A. Osenbrück
by Munn & Co
Attorneys.
N. PETERS, PHOTO-LITHOGRAPHER, WASHINGTON, D. C.

UNITED STATES PATENT OFFICE.

JOHANNES A. OSENBRÜCK, OF HEMELINGEN, NEAR BREMEN, GERMANY.

BEARING.

SPECIFICATION forming part of Letters Patent No. 229,171, dated June 22, 1880.

Application filed May 20, 1880. (No model.).

*To all whom it may concern:*

Be it known that I, JOHANNES AUGUST OSENBRÜCK, of Hemelingen, near Bremen, Germany, have invented a new and Improved Bearing, of which the following is a specification.

The object of my invention is to provide a new and improved bearing which is simple in construction and which can carry great weights without the friction which acts so destructively upon the bearings in use at present and renders them useless.

The invention consists in a bearing provided with one or more disks for distributing the lubricating material, which disks are below the spindle in case the same is vertical, and are rotated by the spindle by means of intermediate gearing in such a manner that the said disks rotate in the same manner as the spindle, but their rapidity decreases in arithmetical progression from the end of the spindle.

In the accompanying drawings, Figure 1 is a cross-sectional elevation of a step-bearing provided with one distributing-disk. Fig. 2 is a plan view of the same, showing the spindle removed. Fig. 3 is a horizontal sectional view of the same on the line $w\,w$, Fig. 1. Fig. 4 is a horizontal sectional view of the same on the line $x\,x$, Fig. 1. Fig. 5 is a cross-sectional elevation of a step-bearing provided with two distributing-disks. Fig. 6 is a plan view of the same, showing the spindle removed. Fig. 6ª is a horizontal sectional view of the same on the line $y\,y$, Fig. 1. Fig. 7 is a cross-sectional elevation of the lid of the casing of a step-bearing provided with my improvements. Fig. 8 is a plan view of the same. Fig. 9 is a partial longitudinal sectional elevation of a horizontal shaft provided with rings or disks for distributing the lubricating material.

Similar letters of reference indicate corresponding parts.

The spindle A is surrounded by a sleeve, B, and rests upon a bronze distributing-disk, $a$, provided with teeth. The lower surface, $b$, of the disk $a$ consists of steel, and is united with the disk $a$ by means of a series of studs, $c\,c$. The steel surface $b$ of the disk $a$ rests upon a disk, $d$, which rests in a recess in the casing E of the bearing, and is held by a pin or stud, $d'$, which prevents it from rotating.

The spindle A is provided with a square or angular aperture in the bottom, and into this aperture the upper angular end of a vertical hollow shaft, $g$, passes, whereby the shaft $g$ is rotated with the spindle A. The shaft $g$ passes through the disks $a$ and $d$, and has a ratchet-wheel, $h$, attached to its lower end, which wheel $h$ engages with a smaller ratchet-wheel, $h'$, attached to the lower end of a shaft, $i$, to the upper end of which a ratchet-wheel, $k$, engaging with the teeth of the disk $a$, is attached. Thus if the spindle A rotates, the shaft $g$ and wheel $h$ will rotate with it, and as the wheel $h$ engages with the wheel $h'$ the latter and the wheel $k$ will be rotated, and as the wheel $k$ engages with the teeth of the disk $a$ the latter will be rotated with less rapidity than that of the spindle A.

The lubricating material is filled into the casing E, passes through the ducts $k'\,k'$ into the lower part of the casing, and rises in the hollow shaft $g$. It passes through apertures $m\,m$ in the hollow shaft $g$ to the distributing-disk $a\,b$, which is provided with two or more spiral or other grooves on its upper surface. The fixed disk $d$ is provided with like grooves on its upper surface, and by these grooves in the said disks the lubricating material is conducted to the bearing-surfaces of these disks and the spindle. The casing E is kept filled with lubricating material, so that all the parts of the bearing are surrounded therewith, and by the adhesion of the oil or other material on the moving parts a perfect circulation of the lubricating material is obtained.

Figs. 5, 6, and 6ª show a spindle-bearing with two distributing-disks. In this case the spindle J rests upon the upper bronze distributing-disk, $o$, which in turn rests upon the steel distributing-disk $p$, both of which are provided with teeth. The disk $p$ rests upon a base-plate or disk, $q$, which is secured to the bottom of the casing L. A hollow vertical shaft, $r$, is attached to the bottom plate $q$, and passes through the disks $o$ and $p$ and into the bottom of the spindle J. The disks $o$ and $p$ are rotated by means of two spur-wheels, $n'$ and $n^2$, on a vertical shaft, $n^3$, arranged at the side of the spindle J, and having a spur-wheel, $m'$, mounted on its upper end, which spur-wheel $m'$ engages with a spur-wheel, $m^2$, on the spindle. The spur-wheel $m'$, the shaft $n^3$, and the spur-wheels $n'$ and $n^2$ are rotated by the spur-wheel $m^2$, and as the wheel $n^2$ is smaller than the wheel $n'$ it is evident that the disk $p$ will rotate much slower than the disk $o$. The hollow shaft $r$ is provided with openings $i$ to permit the oil or other material that rises in said shaft to pass out to the disks $o$ and $p$, the latter of which is provided with spiral or radial grooves on the upper and lower sides. The casing L is entirely filled with lubricating material, which circulates and is distributed in the manner described above in connection with the bearing with one distributing-disk.

Figs. 7 and 8 represent a lid, P, of the casing or box of the step-bearing. The aperture for the spindle is provided with an annular trough, O, which is filled with any desired or suitable kind of liquid. A saucer-shaped collar, R, provided with a flange, S, is attached to the spindle A in such a manner that the flange S projects into the liquid in the annular trough O, thus closing the bearing effectually against dust or other impurities.

Fig. 9 shows the bearing of a horizontal shaft, C, provided with a fixed collar, B, and with a number of loose collars provided with teeth at each side of said collar B. In this case three collars, with teeth $a'$ $b'$ $c'$ and $a^2$ $b^2$ $c^2$, are arranged at each side of the fixed collar B. These loose collars are rotated by means of corresponding ratchet-wheels mounted on a shaft, T, which is rotated by a ratchet-wheel, W, mounted thereon, and engaging with teeth on the rigid collar B. All these collars are provided with transverse perforations $g^2$ near the inner curved surfaces and with radial grooves $r'$ $r'$ on one or both sides, which perforations and grooves aid in distributing the oil or other lubricating material.

Having thus described my invention, I claim as new and desire to secure by Letters Patent—

1. A bearing made substantially as herein shown and described, and constructed with a series of disks for distributing the lubricating material, which disks are rotated by the spindle or shaft by means of intermediate gearing, as set forth.

2. In a step-bearing, the combination, with the spindle A, of the vertical shafts $g$ and $i$, spur-wheels $h$, $h'$, and $k$, and the distributing-disk $a$, substantially as herein shown and described, and for the purpose set forth.

3. In a step-bearing, the combination, with the hollow vertical shaft $g$, provided with apertures $m$ $m$, of the oil or lubricating-material distributing disk $a$, provided with peripheral teeth, and with radial or spiral grooves on the bearing-surfaces, substantially as herein shown and described, and for the purpose set forth.

4. In a step-bearing, the combination, with the spindle J, of the vertical shafts $n^3$ and $r$, spur-wheels $n'$, $n^2$, $m'$, and $m^2$, and toothed disks $o$ and $p$, for distributing the lubricating material, substantially as herein shown and described, and for the purpose set forth.

5. In a step-bearing, the combination, with the spindle J, of the saucer-shaped collar R, provided with a flange, S, and of the lid P, provided with an annular trough, O, substantially as herein shown and described, and for the purpose set forth.

6. In a bearing, the combination, with the horizontal shaft C, of a toothed fixed collar, B, and the toothed loose collars $a'$ $b'$ $c'$ and $a^2$ $b^2$ $c^2$, and of the ratchet-wheel W, and a series of intermediate ratchet-wheels mounted on a shaft, T, parallel to the main shaft C, substantially as herein shown and described, and for the purpose set forth.

The above specification of my invention signed by me this 26th day of November, 1879.

JOHANNES AUGUST OSENBRÜCK.

Witnesses:
LUDWIG WILHELM JUSTUS OSENBRÜCK,
GUSTAV ADOLF OSENBRÜCK.